United States Patent [19]
White

[11] Patent Number: 4,882,476
[45] Date of Patent: Nov. 21, 1989

[54] BAR CODE READER WITH ENHANCED SENSITIVITY

[75] Inventor: Jonathan R. White, Cedar Rapids, Iowa

[73] Assignee: Norand Corporation, Cedar Rapids, Iowa

[21] Appl. No.: 905,779

[22] Filed: Sep. 10, 1986

[51] Int. Cl.[4] .................................................. G01J 3/34
[52] U.S. Cl. ..................................... 235/462; 235/465; 235/469
[58] Field of Search ................. 235/454, 462, 465, 469

[56] References Cited

U.S. PATENT DOCUMENTS 3,643,066 2/1972 Coliz et al. ............................ 235/469
3,784,832 1/1974 Sewell ................................... 235/469

Primary Examiner—A. D. Pellinen
Assistant Examiner—Jeffrey A. Gaffin
Attorney, Agent, or Firm—Neuman, Williams, Anderson & Olson

[57] ABSTRACT

In laser bar code scanners bright sunlight tends to overpower the reflected laser light, drastically reducing the difference between bar code and background signals. In the present bar code reader, a plurality of light detectors are utilized with different spectral response characteristics at the wavelength of the incident laser beam, such that the differential response of the detectors tends to minimize the effect of background illumination. Narrowband optical filters with offset passbands may be used with conventional light sensors. As another example, filters with long wavelength transmission characteristics and offset cutoff wavelengths may be employed if necessary with a neutral density filter to provide balanced responses under broadband illumination.

35 Claims, 1 Drawing Sheet

4,882,476

BAR CODE READER WITH ENHANCED SENSITIVITY

SUMMARY OF THE INVENTION

This invention relates to an optical reading system and method, and particularly to a laser bar code reader system.

It is an object of the invention to provide a bar code reader of enhanced sensitivity, and/or a reader requiring a lower power laser light source, with consequent greater safety, better adaptability to hand-held and/or portable (battery powered) operation, less heat to dissipate and longer life expectancy.

Another object of the invention is to provide a laser bar code reader particularly adapted to reliable operation in sunlight.

A further object is to provide a laser beam scanner unit for reliably reading optical information, wherein the beam is swept along an extended scanning path at an information containing surface, and which scanner unit is particularly adapted to operation under daylight conditions.

Other objects, features and advantages of the invention will be apparent from the following detailed description, taken in connection with the accompanying sheet of drawings, and from the respective features and relationships of the appended claims.

DETAILED DESCRIPTION

Figure 1:
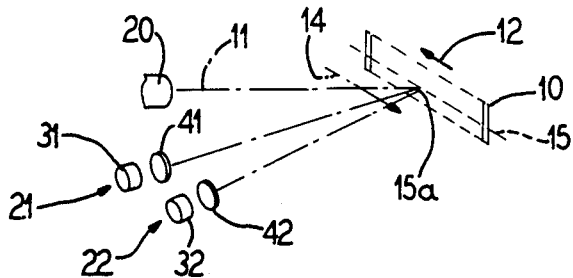
FIG. 1 is a diagramatic illustration of a laser bar code reader system in accordance with the present invention.

FIG. 1 is intended as a generic illustration wherein scanning of a bar code label 10 takes place by relative movement between a laser beam indicated at 11 and the bar code label 10. For example, the label may be moved in a longitudinal direction as indicated by arrow 12, or the laser beam may be moved in a scanning direction such as indicated at 14 for impingement on successive points along a scanning path such as indicated at 15.

By way of example, a laser light source is indicated at 20 and respective light detectors 21 and 22 are shown for receiving reflected light produced by the beam 11 at each successive point along the scanning path 15. By way of example, detectors 21 and 22 may be fixedly secured in a housing with the laser source 20 so as to be focused at a common point such as indicated at 15a at a suitable distance from an end face of the housing. In one type of embodiment with common point focus, the label 10 may be moved longitudinally as indicated at 12 so as to effect sequential scanning of the complete bar code. In another example, the housing itself may be moved in the direction of arrow 14 so that the complete bar code is sequentially scanned. In a further example, laser light source 20 and detectors 21 and 22 may be pivotally mounted within the housing so as to jointly sweep along the scanning path 15 so as to scan a complete bar code. In another type of a scanner, the laser light source 20 is equipped with scanning means for causing the beam 11 to scan along a scanning path such as indicated at 15 at a selected distance from the housing, while detectors 21 and 22 are arranged to collect reflected light from each successive point along the scanning path 15. Alternatively, the laser light source 20 may be simultaneously illuminate the entire regin 15 and the detector means 21 and 22 may be pivotally mounted to sequentially scan successive points along the region 15.

In a specific example in accordance with the present invention, detectors 21 and 22 comprise respective light sensors 31 and 32 which may be identical, and respective filters 41 and 42 which provide generally comparable response to sunlight but provide substantially different responses to the limited spectral band transmitted by the light source 20, such that an enhanced sensitivity is provided by a differential between the outputs from sensors 31 and 32.

Figure 2:
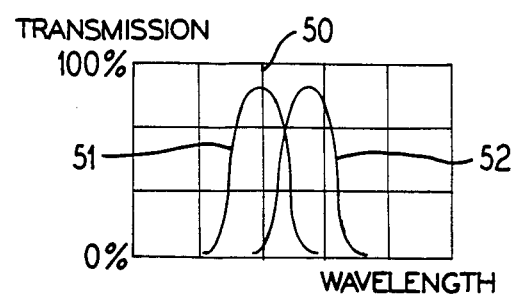
FIG. 2 is a graphical illustration for explaining one embodiment of filter means for use in FIG. 1.

In the embodiment of FIG. 2, laser light source 20 supplies a wavelength of light as indicated at 50 and the filters 41 and 42 have bandpass spectral properties as indicated at 51 and 52.

Figure 3:
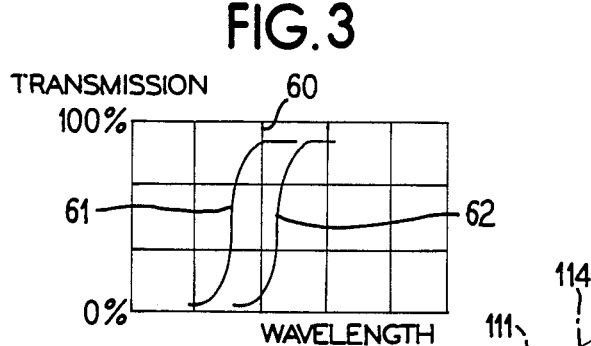
FIG. 3 illustrates another embodiment of filter means for use in FIG. 1.

In the embodiment of FIG. 3, the wavelength of the laser light source 20 is indicated at 60 and the broadband spectral transmission properties of the respective filters 41 and 42 are indicated at 61 and 62.

In each of the embodiment of FIGS. 2 and 3, the ordinate axis may represent transmission between zero percent and one hundred percent. In each case, the outputs from detectors 21 and 22 are preferably substantially balanced, that is of equal amplitude in the presence of sunlight alone, the differential in a transmission at the wavelength 50 or 60, being at least fifty percent in the examples of FIGS. 2 and 3.

Figure 4:
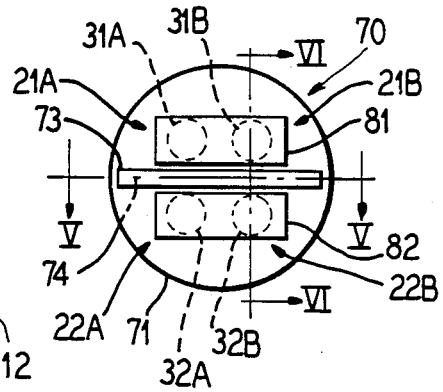
FIG. 4 is a diagramatic end elevational view of a laser bar code scanner unit wherein the laser beam is to be swept over an extended scanning path to read a relatively wide bar code label.

In FIG. 4, there is indicated a scanner unit 70 including a housing with an end face of 71 which is arranged to confront a bar code label such as indicated at 10 in FIG. 1 at a selected distance such as three or more inches. In the indicated example of FIG. 4, the laser beam may be scanned along the length of an elongated window indicated at 73 and may effect scanning in a plane such as indicated at 74 which would include the scanning path such as in indicated at 15 in FIG. 1.

In the exemplary embodiment of FIG. 4, an array of first and second light detectors is provided with the first detectors such as 21A and 21B and the second detectors such as 22A and 22B, being arranged in respective pairs such as 21A, 22A along the locus of reflected light produced by the scanning of the laser beam. For the example of two pairs as shown in FIG. 4, and for scanning of the laser beam from left to right as viewed in FIG. 4, during scanning of a left segment of the label, reflected light would predominately reach the detectors 21A and 22A. In a mid region of the label, reflected light would reach both pairs of detectors with comparable magnitude, and for a right-hand segment of the bar code label, the reflected light would predominately reach the right-hand pair of detectors 21B, 22B. For each point along the scanning path the reflected light reaching a first detector such as 21A of a pair would be of substantially equal magnitude with the reflected light reaching the second detector such as 22A of such pair.

In the specific example of FIG. 4, a common filter element 81 having spectral characteristics as indicated at 51 or 61 may cover all of the first light sensors such as 31A and 31B of the array, while a common filter element 82 having the spectral transmission properties 52 or 62 may be assoaicated with the second light sensors of the array such as indicated at 32A and 32B. By way of example, window 73 and filter elements 81 and 82 may form part of the end face 71 of the housing of the laser bar code reader unit of FIG. 4, other portions of the end face 71 being opaque, so that light can only enter or exit the housing through window 73 and filter elements 81 and 82.

Figure 5:
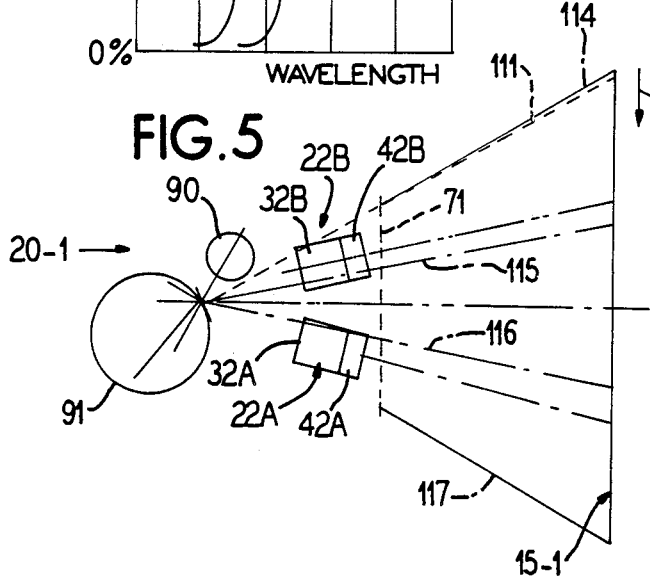
FIG. 5 is a somewhat diagramatic view taken generally along the line V—V of FIG. 4.

In FIG. 5, laser light source means 20-1 is indicated as comprising a laser source 90 and a suitable scanner system 91 which may cause a laser beam 111 of a wavelength such as indicated at 50 or 60 to be focused at a point along the scanning path 15-1 and to scan along the path as indicated by arrow 112. For beam positions between those indicated at 114 and 115, reflected light is predominately received by the pair 21B, 22B. For beam positions between 115 and 116, comparable amplitudes of reflected light may reach both pairs 21B, 22B and 21A, 22A, while for beam positions between 116 and 117, reflected light may predominate at the pair of detectors 21A, 22A.

In the example of FIG. 5, each detector may have an individual filter element such as filter elements 42A and 42B associated with respective second light sensors 32A and 32B. In FIG. 5, end face 71 may provide a common optical window for transmitting the laser beam 111 at a region such as 73, FIG. 4, and for admitting reflected light at regions such as indicated at 81 and 82 in FIG. 4.

Figure 6:
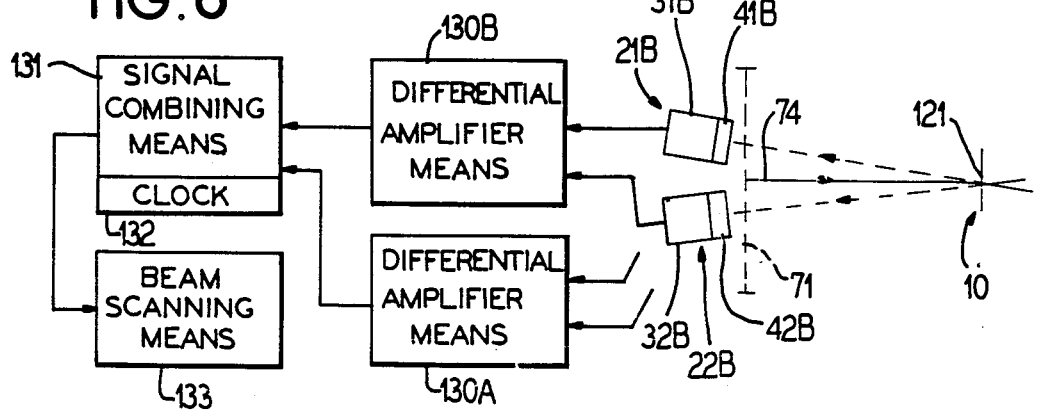
FIG. 6 is a diagramatic view taken generally along the line VI—VI in FIG. 4 and indicating exemplary electronic circuitry for association with the swept laser beam scanner embodiment of FIGS. 4, 5 and 6.

As seen in FIG. 6, each pair of light detectors of the array, such as first and second detectors 21B and 22B are symetrically arranged with respect to the plane 74 of the scanning laser beam so that the paths for reflected light from each point such as indicated at 121 along the scanning path 15-1 to detectors 21B and 22B are equal. As in FIG. 5, each detector is shown as comprising a sensor such as 31B, 32B, and a filter element such as 41B, 42B with respective spectral transmission properties as indicated in FIG. 2 or FIG. 3. In each of the embodiments, as indicated in FIG. 6, the output of each detector pair such as 21B, 22B may be supplied to a differential amplifier means such as indicated at 130A, 130B. The outputs of the detector pair 21A, 22A may be supplied to the differential amplifier means 130A, and the outputs of differential amplifier means 130A and 130B may be suitably combined either on an analog basis or on a digital basis to provide a resultant bar code signal to be decoded. By way of example, a clock 132 may be connected with component 131, and with a beam scanner control means 133 may be constructed and operated so that component 131 can determine the position of the beam 111 with reference to the zones 114–115, 115–116, and 116–117, respectively. For example component 131 may supply pulses derived from clock pulses to component 133 to drive the scanning operation. Alternatively, beam driving pulses may be generated at component 133 and supplied also to component 131.

It is contemplated that the present embodiments will provide a more reliable bar code reading with a given laser source and under natural and supplementary lighting conditions, and further may allow the use of a lower power laser light source, with many attendant benefits such as greater safety, better adaptability to portable (battery powered) and hand-held use, less heat to dissipate, and therefore expected longer life. A differential between the outputs of detectors such as indicated at 21 and 22 will provide superior noise rejection properites in comparison to a detector such as 31 by itself. If necessary, a neutral density filter could be combined with one or the other of the filters such as 41 and 42 to balance the detector outputs under broadband illumination (e.g. sunlight).

Figure 7:
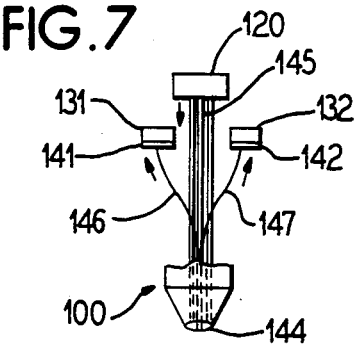
FIG. 7 illustrates a wand type bar code scanner in accordance with the present invention.

FIG. 7 shows a hand-held wand type canner 100 according to FIG. 2 or FIG. 3 wherein a light emitting diode or other narrow band light source 120 produces a band of light for example in the infrared region. In this case, wavelength 50 or 60 may be of the order of 910 nanometers, and light sensors 131 and 132 may be particularly sensitive at this wavelength. According to the example of FIG. 2, filters 141 and 142 have passbands as indicated at 51 and 52 respectively, while according to the example of FIG. 3, the filters 141 and 142 have overlapping wideband characteristics as indicated at 61 and 62. In each case, the outputs of the light sensors 131 and 132 may be supplied to differential amplifier means such as 130B, FIG. 6, so as to provide a resultant output especially sensitive to a bar code scanned thereby even in the presence of ambient daylight illumination.

In one embodiment according to FIG. 7, light is transmitted from light source 120 to a light port 144 via optical fibers 145, and reflected light is transmitted via respective optical fibers such as indicated at 146 and 147 which terminate at a small-area central region of light port 144. By way of example, the reflected light transmitting fibers such as 146 and 147 may be essentially uniformly distributed at the port 144 over a central circular area which is small in comparison to the size of a minimum width bar of a bar code to be scanned, so that ambient light has less effect on resolution than where the size of the incident light spot is relied upon to define scanning resolution.

Where lenses are utilized, the reflected light is preferably collected by symmetrically arranged lenses focussed at a common reflected light pickup region at the bar code for high resolution scanning of the bar code. (The pickup region may have a small diameter in comparison to a minimum bar dimension.) Preferably in this case also equal amounts of reflected light are transmitted to respective photodetectors such as 131,141 and 132,142. Again it is preferred that the reflected light optics provide the required resolution independently of the size of the incident light spot from the light source such as 120 so that resolution is less affected by the presence of intense ambient light.

Preferably in each case the response characteristics of the detectors with respect to reflected light are so matched that the first and second light sensors such as 131 and 132 provide essentially equal signals when the light source 120 is not energized and the light port 144 is held against the bar code, for each incremental position of port 144 along the length of the bar code, even in the presence of sunlight.

Light source 120 may be a conventional light source for a wand type scanner such as a light emitting diode, or may be a laser light source.

It will be apparent that many modifications and variations may be effected without departing from the scope of the novel concepts and teachings of the present invention.

I claim as my invention:

1. A bar code reading system comprising light source means projecting light concentrated in a given limited spectral band, first and second light detector means arranged for receiving light from the light source means after reflection from a bar code, and for supplying respective first and second light responsive outputs, said first and second light detector means providing comparable outputs in response to ambient light, and providing different responses to said given limited spectral band, such that an enhanced sensitivity to the light in said given limited spectral band which is reflected from the bar code is provided by a differential between the first and second light responsive outputs, said first and second light detector means comprising first and second light sensitive means responsive to light transmitted thereto for supplying said respective first and second light responsive outputs, and optical filter means in the path of reflected light from a bar code to the first and second light sensitive means, said optical filter means transmitting a first spectral band substantially including said limited spectral band to said first light sensitive means and transmitting a second spectral band substantially excluding said limited spectral band to said second light sensitive means.

2. A bar code reading system according to claim 1, said optical filter means comprising first and second optical filters interposed in the path for reflected light leading to the first and second light sensitive means, respectively, said first and second optical filters having respective offset bandpass spectral properties.

3. A bar code reading system according to claim 1, said optical filter means comprising first and second optical filters interposed in the path for reflected light leading to the first and second light sensitive means, respectively, said first and second optical filters having broadband overlapping spectral properties which have comparable spectral properties except in the region of said given limited spectral band.

4. A bar code reading system according to claim 1, said light detector means providing for substantially balanced outputs from the first and second light sensitive means in the presence of ambient light along.

5. An optical reading system characterized by being relatively insensitive to sunlight, said system comprising laser light source means scanning a laser beam of a limited spectral band over successive points of a scanning path to produce reflected light of a limited spectral band which occupies a locus of reflected light paths during scanning of the laser beam, and an array of first and second light detectors having respective first and second spectral response characteristics so as to provide essentially comparable outputs in response to sunlight, while the first detectors are differentially sensitive to said limited spectral band, respective pairs of said first and secon light detectors being distributed over said locus of reflected light paths such that a reliable differential measure of the reflected light of the laser beam is provided for each successive scanning point of the laser beam along its scanning path, each pair of said first and second light detectors comprising first and second optical filter means and first and second light sensitive means, said first optical filter means transmitting a first spectral band comprising at least a portion of said limited spectral band to one of said first light sensitive means and said second optical filter means transmitting a second spectral band substantially excluding said limited spectral band to one of said second light sensitive means.

6. An optical reading system according to claim 5, said first and second optical filter means having respective offset bandpass spectral properties.

7. An optical reading system according to claim 5, said first and second optical filter means having broadband overlapping spectral properties which have comparable spectral properties except in the region of said given limited spectral band.

8. An optical reading system according to claim 5, said first and second light detectors of each pair providing for substantially balanced outputs in the presence of sunlight alone.

9. An optical reading system according to claim 5, said array of first and second light detectors comprising a plurality of first and second light sensors, and a first spectral filter common to said plurality of first light sensors, and a second spectral filter common to said plurality of second light sensors.

10. An optical reading system according to claim 5, said laser beam being scanned in a scanning plane, said first light detectors being at one side of the scanning plane and said second light detectors being at an opposite side of the scanning plane.

11. An optical reading system for reading optical information in the presence of broadband ambient light, said system comprising light source means for illuminating optical information so as to generate a light signal of limited spectral bandwidth representing the optical information, first and second optical sensor means receiving said light signal and generating first and second outputs, respectively, means causing said first and second optical sensor means to provide different spectral response characteristics for said limited spectral bandwidth, but to provide first and second outputs which are substantially balanced in the presence of broadband ambient light alone, and means coupled with said first and second optical sensor means and responsive to the differential between said first and second outputs to provide a sensitive measure of said light signal in the presence of broadband ambient light.

12. An optical reading system according to claim 11 with said light source means comprising a laser light source means.

13. An optical reading system according to claim 11 with said light source means comprising light emitting diode means supplying light with limited spectral bandwidth to said optical information.

14. An optical reading system according to claim 11 with said first and second optical sensor means comprising first and second arrays of optical sensors.

15. An optical reading system according to claim 11 with said means causing said first and second optical sensor means to provide different spectral response characteristics, causing said second optical sensore means to receive at least fifty percent less light at a wavelength within said limited spectral bandwidth than said first optical sensor means.

16. An optical reading system according to claim 11 with said means causing said first and second optical sensor means to provide different spectral response characteristics, causing the repsonse of the first optical sensore means to exhibit a response characteristic including said limited spectral band, and causing the response of the second optical sensor means to exhibit a response characteristic substantially excluding said limited spectral band.

17. An optical reading system according to claim 11 with said means causing said first and second optical sensor means to provide different spectral response characteristics, providing responses which are each of the bandpass type but only one of which including said limiting spectral bandwidth.

18. An optical reading system according to claim 17, with the light received by the second optical sensor means being at least fifty percent less than the light received by the first optical sensor means at a wavelength within said limited spectral bandwidth.

19. An optical reading system according to claim 11, with said means causing said first and second optical sensor means to provide different spectral response characteristics, providing reponses which are of the broadband overlapping type and only one of which including said limited spectral bandwidth.

20. An optical reading system according to claim 19, with the light received by the second optical sensor means being at least fifty percent less than the light received by the first optical sensor means at a wavelength within said limited spectral bandwidth.

21. An optical reading system comprising
light source means of limited spectral bandwidth illuminating optical information so as to generate a light signal representing the optical information, and supplying light in a scanning plane intersecting the optical information, and
first and second sets of light detector means disposed respectively above and below the scanning plane, and arranged so as to intercept generally equal magnitudes of said light signal.

22. An optical reading system according to claim 21, said light source means comprising laser light source means generating a scanning laser beam deflected along an extended scanning path, the scanning laser beam lying in said scanning plane and substantially equidistant from the first and second sets of light detector means.

23. An optical reading system according to claim 22, with means coupled with the light detector means of the first and second sets and providing an output which is a function of the differential between the outputs of the first and second sets, one set being responsive primarily to ambient light, and the other set being responsive both to the ambient light and the light signal generated by the scanning laser beam.

24. An optical reading system according to claim 21, with means coupled with the light detector means of the first and second sets and providing an output which is a function of the differential between the outputs of the first and second sets, one set being responsive primarily to ambient light, and the other set being responsive both to ambient light and to the light signal generated by the light source means.

25. The method of reading optical information which comprises illuminating the optical information to produce a light signal representing the optical information,
transmitting to a first photosensor means a first spectral distribution including ambient light and the light signal representing the optical information,
transmitting to a second photosensor means a second spectral distribution which includes ambient light but results in substantial attenuation of the light signal, and
forming an output corresponding to the differential between the outputs from the first and second photosensor means, as a sensitive measure of the optical information in the presence of ambient light.

26. The method of claim 25, wherein the illuminating step comprises deflecting a laser beam to scan the optical information and to produce a light signal representing the optical information which has a wavelength such that the differential in transmission of such wavelength to said first and second photosensor means is at least fifty percent.

27. The method of claim 25, wherein bandpass optical filter means is interposed in the path of the light signal such that the first and second spectral distributions are transmitted to the first and second photosensor means respectively, with a differential in the transmission of the light signal of at least fifty percent.

28. The method of claim 25, wherein broadband filter means is interposed in the path of the light signal such that the first and second spectral distributions are transmitted to the first and second photosensor means respectively, with a differential in the transmission of the light signal of at least fifty percent.

29. The method of claim 25, wherein the illuminating step is effected by laser light source means which emits light falling within a narrow spectral band wherein first bandpass filter means with a first pass band including the narrow spectral band is interposed in a first light path of the light signal leading to the first photosensor means, and wherein second bandpass filter means having a second pass band offset from the first pass band of the first bandpass filter means is interposed in a second light path of the light signal leading to the second photosensor means.

30. The method of claim 25, wherein the illuminating step is effected by laser light source means which emits light falling within a narrow spectral band, and wherein a broadband spectral distribution including said narrow spectral band is transmitted to said first photosensor means, and a broadband spectral distribution substantially excluding said narrow spectral band is transmitted to said second photosensor means.

31. The method of claim 25, wherein the first and second spectral distributions transmitted to the first and second photosensor means produce outputs from the first and second photosensor means which are substantially balanced in the presence of sunlight and absence of said light signal.

32. The method of reading optical information which comprises
illuminting optical information with light of a narrow spectral band so as to produce a light signal representing the optical information,
collecting the light transmitted along first and second light paths from the optical information,
transmitting light from the first light path to a first optical detector means having a spectral response including said narrow spectral band, transmitting light from the second light path to a second optical detector means having a spectral response such that the narrow spectral band is attenuated by at least fifty percent, and producing an output which is a function of the differential between the outputs of the first and second optical detector means.

33. The method of claim 32, wherein the spectral responses of the first and second optical detector means are such that the first and second optical detector means provide substantially balanced outputs therefrom in the presence of daylight and absence of the light signal.

34. The method of claim 32, wherein the first and second optical detector means have offset bandpass spectral responses.

35. The method of claim 32, wherein the first and second optical detector means have first and secon wideband spectral responses, the first including the narrow spectral band and the second substantially excluding the narrow spectral band.

* * * * *